United States Patent [19]

Hasegawa et al.

[11] Patent Number: 4,489,993
[45] Date of Patent: Dec. 25, 1984

[54] CRT MOUNTING STRUCTURE

[75] Inventors: Hiroshi Hasegawa; Yoshitaka Tsutsui; Yoshinori Horikawa; Seii Miyakawa, all of Yokohama, Japan

[73] Assignee: Hitachi, Ltd., Tokyo, Japan

[21] Appl. No.: 388,613

[22] Filed: Jun. 15, 1982

[30] Foreign Application Priority Data

Jun. 17, 1981 [JP] Japan .................................. 56-92325

[51] Int. Cl.³ ............................................. A47B 81/06
[52] U.S. Cl. .................................................. 312/7.2
[58] Field of Search ............... 206/332, 480, 482, 483; 248/27.1, 544; 358/248, 254; 312/7.2

[56] References Cited

U.S. PATENT DOCUMENTS

| | | | |
|---|---|---|---|
| 3,251,939 | 5/1966 | Pestka et al. | 358/254 |
| 3,290,532 | 12/1966 | Lemke et al. | 358/248 |
| 3,444,991 | 5/1969 | Raybois | 206/482 |
| 3,576,395 | 5/1969 | Arrington | 358/248 |
| 3,606,844 | 9/1971 | Lubker et al. | 108/901 |
| 3,651,257 | 3/1972 | Goetz, Jr. | 358/248 |
| 3,759,194 | 9/1973 | Fujii | 108/901 X |
| 4,051,787 | 10/1977 | Nishitani et al. | 108/901 X |
| 4,340,199 | 7/1982 | Brock | 248/544 |

Primary Examiner—William E. Lyddane
Assistant Examiner—Joseph Falt
Attorney, Agent, or Firm—Antonelli, Terry & Wands

[57] ABSTRACT

A CRT mounting structure capable of inserting smoothly and readily a CRT into a predetermined position of a cabinet by fixedly securing to the opening of the CRT, guide ribs each having taper surfaces, along the adjacent two sides of an opening substantially in the form of a rectangular shape and by fixedly securing guide posts for guiding the CRT along the opposite edges to the adjacent two edges.

3 Claims, 5 Drawing Figures

CRT MOUNTING STRUCTURE

BACKGROUND OF THE INVENTION

This invention relates to a CRT (Cathode Ray Tube) mounting structure capable of readily and smoothly mounting a CRT onto a cabinet for TV sets in a TV set assembling process.

In case where a CRT is mounted on a cabinet, a front panel of the CRT must be brought into intimate contact with a rectangular opening formed in a front surface of the cabinet so that the front panel of the CRT is exposed from the front surface of the cabinet.

In order to meet this requirement, in general, at respective corners of an underside of the cabinet are integrally provided mounting seats for securing the CRT by screws and reinforcement bosses for reinforcing the mounting seats. On the other hand, a tension band is wound and secured onto a periphery, of the CRT, close to the front panel. By this tension band, four lugs are secured to four coners of the front panel corresponding to the mounting seats, respectively.

Then, the four mounting seats and the four lugs are couplings by screws to each other, thereby securing the CRT to the cabinet. However, at this time, a high mechanical accuracy is required for a positional relation between the front panel of the CRT and the opening of the cabinet. Therefore, the above described bosses serve not only as reinforcement members for the mounting seats but also as stops for positioning the CRT. For this reason, the reinforcement bosses are provided in assembly in a intimate contact with the tension band wound on and fixed to the periphery of the CRT under the condition that the CRT is secured to the cabinet.

As described above, according to the conventional CRT mounting structure, a problem is raised in which when the CRT is mounted on the cabinet, the tension band might be laid on top edge portions of the reinforcement bosses to thereby prevent the smooth assembling work. In case where the CRT is manually mounted, this problem is not serious. However, in case where the assembling of the CRT is carried out by automatic line processes such as industrial robots, the assembling is not well achieved or the reinforcement bosses would be damaged to cause a serious problem.

SUMMARY OF THE INVENTION

An object of the present invention is to provide a CRT mounting structure capable of readily inserting a CRT to a predetermined position of the cabinet without a fear that a tension band would on the CRT might interfere with a mounting member such as a reinforcement boss or the like to thereby prevent the CRT mounting work.

In order to achieve the above noted and other objects, there is provided according to the present invention a CRT mounting structure in which CRT guide ribs having tapered portions are fixed to a cabinet provided therein with a substantially rectangular opening on which the CRT is mounted, along the adjacent two edges of the opening, and the guide posts are fixedly provided along other edges opposite the edges having the guide ribs.

DESCRIPTION OF THE PREFERRED EMBODIMENT

Figure 1:
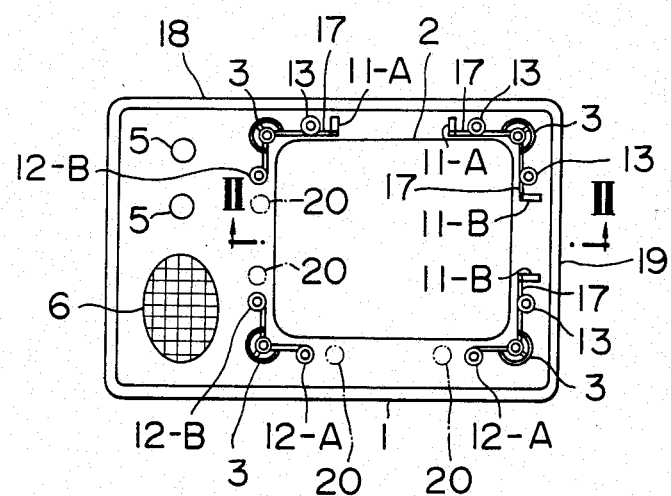
FIG. 1 is a rear view of a cabinet having a CRT mounting structure in accordance with one embodiment of the present invention.

As shown in FIG. 1, a cabinet 1 is provided with an opening 2 for mounting thereon the CRT, CRT mounting seats 3, channel selecting knob openings 5, a mesh 6 for a speaker and the like. The CRT mounting seats 3 are provided adjacent to four corners of the opening 2 which is substantially in the form of a rectangular shape and a plurality (eight in total) of reinforcement bosses are provided near both sides of the mounting seats 3, respectively. For the sake of convenience, the two reinforcement bosses formed along a lower edge of the opening 2 are denoted by reference character 12-A, with the bosses formed along a lefthand edge thereof being denoted by reference character 12-B, and the four bosses formed along the righthand and upper edges being denoted by reference numeral 13, respectively.

In the embodiment shown, two CRT guide ribs 11-A and 11-B, which are positioned adjacent thereto, of the substantially rectangular opening 2 of the cabinet 1 are fixedly secured along the upper and right edges thereof.

Figure 2:
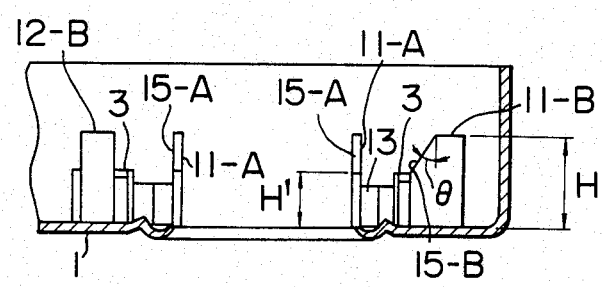
FIG. 2 is a cross-sectional view taken along the line II—II of FIG. 1.
Figure 3:
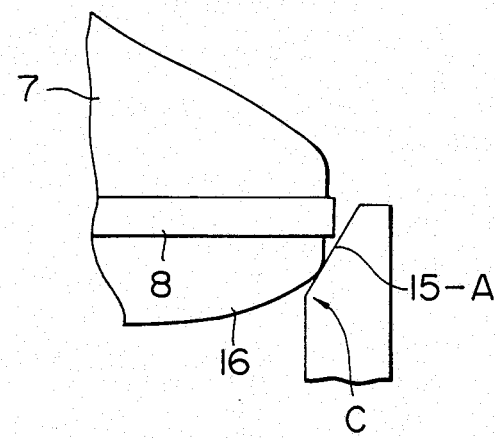
FIG. 3 is an illustration of a configuration of the guide rib used in FIG. 1.

As shown in FIG. 2, a tapered surface 15-B is formed at a top end portion of the guide rib 11-B. H is the total height of the guide rib 11-B and H' is the height of the upright portion of the tapered surface. A taper angle $\theta$ is practicaly selected in a range of 20° to 40° and, most preferably, at an angle of 30° in view of the workability in the insertion of the CRT 7 and the taper effect.

A guide post 20 is provided along the edge opposite to the righthand edge, i.e., the left edge of the opening 2. This guide post 20 is formed as a linear cylindrical member used for guiding the CRT 7 to a predetermined position. A height of the guide post 20 is substantially equal to or slightly higher than the height H of the guide rib 11-B.

In the embodiment, instead of the provision of the guide post 20 as an independent member in the above described configuration and dimension, the configuration and dimension of the above described reinforcement boss 12-B is selected so as to form a linear cylindrical shape having the height H whereby the reinforcement boss 12-B functions the guide post 20.

In case where the guide post 20 is secured to the cabinet as in independent member, as in the guide post 20 indicated by phantom lines in FIG. 1, each guide post 20 is arranged along the opposed edges of the opening 2 to the edges provided with the guide ribs 11-B so that it is fixedly secured at a position in contact with the tension band 8 wound on the CRT 7 in such a manner that the CRT 7 is guided to a predetermined position.

The height H' of the upright portion of the tapered surface 15-B of the guide rib 11-B is substantially equal to or slightly higher than the height of the CRT mounting seat 3. On the other hand, the height of the reinforcement boss 13 is equal to or lower than the height H' of the upright portion of the tapered surface 15-B.

The dimensional relation in the embodiment of the invention has been described among the reinforcement bosses 12-B, the guide ribs 11-B, the reinforcement bosses 13 and the CRT mounting seats 3. A dimensional relation among the reinforcement bosses 12-A, the guide ribs 11-A each having tapered surfaces 15-A, the reinforcement bosses 13 and the CRT mounting seats 3 is determined in the same manner as described above. Namely, the height of the reinforcement boss 12-A is equal to that of the guide rib 11-A to thereby serve as a guide post. The height of the upright portion of the guide rib 11-A is made equal to or greater than that of the reinforcement boss 13 and the CRT mounting seat 3.

The above described guide rib 11-A and the guide rib 11-B have the same configuration and dimension. While the tension band 8 wound on the CRT 7 is being maintained in parallel to the CRT mounting surface (not shown) of the cabinet, the CRT 7, positioned to deviate slightly toward the guide ribs 11-A and the front panel 16, is brought into sliding contact with the tapered surfaces 15-A of the guide ribs 11-A. At this time, the tapered angle $\theta$ of the taper surface 15-A is selected such that the tension band 8 is not into contact with the tapered surface 15-A. Also, when the front panel 16 is brought into contact with the upright portion C of the tapered surface 15-A, the height H of the guide rib 11-A is selected such that, in the assembly, the top surface of the guide rib 11-A is higher than the lower edge of the tension band 8.

Figure 4:
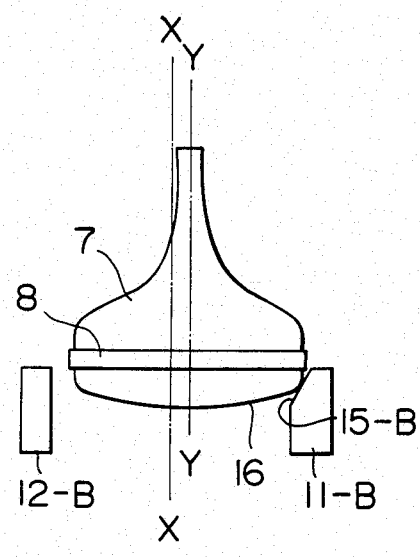
FIGS. 4 and 5 are illustrations of the movement of the CRT in positioning it according to the present invention.
Figure 5:
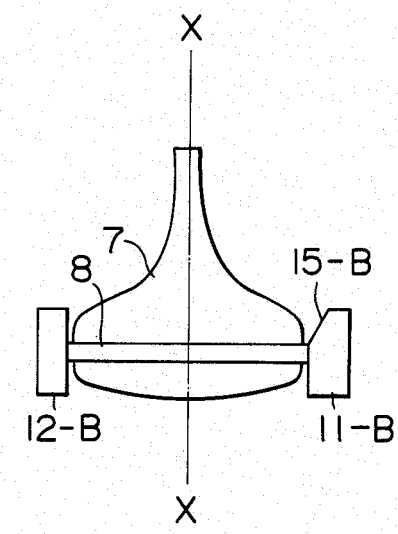

With such a construction, as shown in FIG. 4, when the center line Y—Y of the CRT 7 is positioned to deviate from the correct mounting position X—X toward the guide rib 11-B while the CRT 7 is approaching the mounting position, the front panel 16 of the CRT 7 is brought into sliding contact with the tapered surfaces 15-B of the guide ribs 11-B so that the CRT 7 is guided by the tapered surfaces 15-B so as to come into close contact with the reinforcement bosses 12-B. Since the heights of the reinforcement bosses 12-B are equal to the heights of the guide ribs 11-B, there is no fear that the lower edge of the tension band 8 might be laid around the top portion of the reinforcement bosses 12-B. Thus, the outer peripheral surface of the tension band 8 and the inner surfaces of the reinforcement bosses 12-B are brought into contact with each other. As shown in FIG. 5, the CRT 7 is introduced between the reinforcement bosses 12-B and the guide rib 11-B to thereby be inserted to a predetermined position.

The above described guide effect may be achieved in the same manner with respect to the direction between the reinforcement 12-A and the guide ribs 11-A. Both effects are coupled to each other, and if the mounting operation is carried out while the CRT 7 is deviating somewhat from the predetermined mounting positions to the right and upper sides, the CRT 7 is inserted at the predetermined position smoothly and rapidly while the movements of the CRT 7 are automatically corrected in upward or downward and right or left directions. In case where the cabinet 1 and the guide ribs 11-A, 11-B are integrally made of a plastic material or the like, it is preferable that the guide ribs are not directly provided on the upper plate 18 or side plate 19 of the cabinet 1 but, as shown in FIG. 1, the guide ribs 11-A and 11-B be separated both from the side plate 19 and from the upper plate 18 and each integrally formed with the CRT mounting seat 3 through the reinforcement ribs 17. With such a construction, a deforming defect in molding of the guide ribs 11-A, 11-B is not effected on the upper plate 18 or side plate 19. Furthermore, since the guide ribs 11-A, 11-B are coupled to the mounting seat 3 through the reinforcement ribs 17, a sufficient mechanical strength may readily be obtained.

As described above, according to the present invention, the CRT guide ribs 11-A, 11-B each having tapered surfaces 15-A, 15-B are fixed along the adjacent two edges of the cabinet 1, and the guide posts 20 are fixed along the opposite edges to the edges having the guide ribs 11-A, 11-B. Therefore, when the CRT 7 is mounted on the cabinet, there is no fear that the tension band 8 wound on the CRT 7 might interfere with the members for the CRT mounting structure to degrade the mounting workability. Thus, the CRT 7 may readily be mounted smoothly on a predetermined position of the cabinet 1.

Moreover, it is possible to automatically achieve the inserting operation of the CRT 7 to the cabinet 1, which offers a great advantage in energy-saving and work-saving in assembling of TV sets.

We claim:

1. A CRT mounting structure for inserting and fixing a CRt to a cabinet having a substantially rectangular opening for exposing a front panel of the CRT, the CRT mounting structure comprising:

at least four mounting seats provided on an inside of said cabinet adjacent to four corners of said opening for respectively mounting the CRT;

a plurality of reinforcement bosses provided on the inside of the cabinet, said reinforcement bosses being respectively disposed near both sides of each of said mounting seats and being respectively integrally connected through a reinforcement rib to the respective mounting seats;

guide ribs provided on the inside of said cabinet along two edges of said opening, each of said guide ribs includes an upright portion and an upper surface portion tapering in a direction toward an outside of the cabinet, a height of said upright portion of each of said guide ribs is substantially equal to or greater than a height of said mounting seats;

guide posts provided on the inside of the cabinet along edges of said opening opposite to said adjacent two edges along which said guide ribs are provided, a height of each of said guide posts is substantially equal to or greater than the height of the guide ribs.

2. The structure as claimed in claim 1, in which the taper surfaces of said guide ribs have a taper angle of about 30°.

3. A structure as claimed in claim 1 wherein said reinforcement ribs integrally connect said mounting seats, said reinforcement bosses, and said guide ribs.

* * * * *